United States Patent
Park (10) Patent No.: US 6,729,722 B1
(45) Date of Patent: *May 4, 2004

(54) BASE AND AUXILIARY EYEGLASS SYSTEM USING MAGNETS

(76) Inventor: Hun-Yang Park, 1090-6, Soosung Bosung Apt. 108-205 Soosung-4-ga, Soosung-go, Daegoo (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/328,001

(22) Filed: Dec. 26, 2002

(30) Foreign Application Priority Data

Oct. 24, 2002 (KR) .................................... 2002/65357

(51) Int. Cl.[7] .................................................. G02C 9/00
(52) U.S. Cl. .................................... 351/47; 351/57
(58) Field of Search .......................... 351/47, 57, 48, 351/58, 44, 41, 158

(56) References Cited

U.S. PATENT DOCUMENTS 6,474,811 B2 * 11/2002 Liu .............................. 351/47
6,488,372 B1 * 12/2002 Park .......................... 351/47

* cited by examiner

Primary Examiner—Hung X Dang
(74) Attorney, Agent, or Firm—Jacobson Holman PLLC (57) ABSTRACT

A base and auxiliary eyeglass system in which the auxiliary eyeglasses are not separated from the base eyeglasses but can be unfolded so as to exhibit a similar effect to the case of separating the auxiliary eyeglasses from the base eyeglasses, thereby reducing inconvenience in use of auxiliary eyeglasses in typical eyeglasses such as industrial eyewear, sunglasses, etc., which can rely upon auxiliary eyeglasses attached thereto. A magnetic material is inserted into one side of a base eye rim, and a magnetic material is inserted into one side of an auxiliary eye rim in such a manner as to correspond to the magnet material inserted into the one side of the base eye rim, so that each of the auxiliary eyeglasses can be folded and unfolded. As a consequence, the auxiliary eyeglasses can be unfolded without being separated from the base eyeglasses.

18 Claims, 11 Drawing Sheets

BASE AND AUXILIARY EYEGLASS SYSTEM USING MAGNETS

BACKGROUND OF THE INVENTION

1. Field of the Invention

The present invention relates to the field of eyeglasses and more particularly, to a base and auxiliary eyeglass system using magnets in which a user can easily attach/detach the auxiliary eyeglasses to/from the base eyeglasses as well as fold/unfold the auxiliary eyeglasses in front of the base eyeglasses according to changes in external environment and his or her feelings, thereby reducing inconvenience in the use of auxiliary eyeglasses in conjunction with typical eyeglasses including sunglasses, convex glasses, etc., to which general auxiliary eyeglasses are attached.

2. Background of the Related Art

In general, widely used base eyeglasses with auxiliary eyeglasses are divided into two types. One type is constructed such that each of the base eyeglasses permits a magnet to be directly inserted into one portion of a lug thereof and each of the auxiliary eyeglasses permits another magnet to be inserted into one side thereof which is in contact with the one portion of the lug, so that a user can easily attach/detach the auxiliary eyeglasses to/from the base eyeglasses. The second type is constructed such that an auxiliary bridge for connecting the auxiliary eyeglasses is bent and caught by a base bridge for connecting the base eyeglasses, and then the auxiliary eyeglasses are fixed to the base eyeglasses by additional means.

The applicant of the present invention has filed many applications concerning eyeglasses. Among them, Korean Patent Application No. 10-2001-0075081 and Korean Utility Model Registration No. 266471 will be described in detail with reference to FIGS. 1 and 2.

Figure 1:
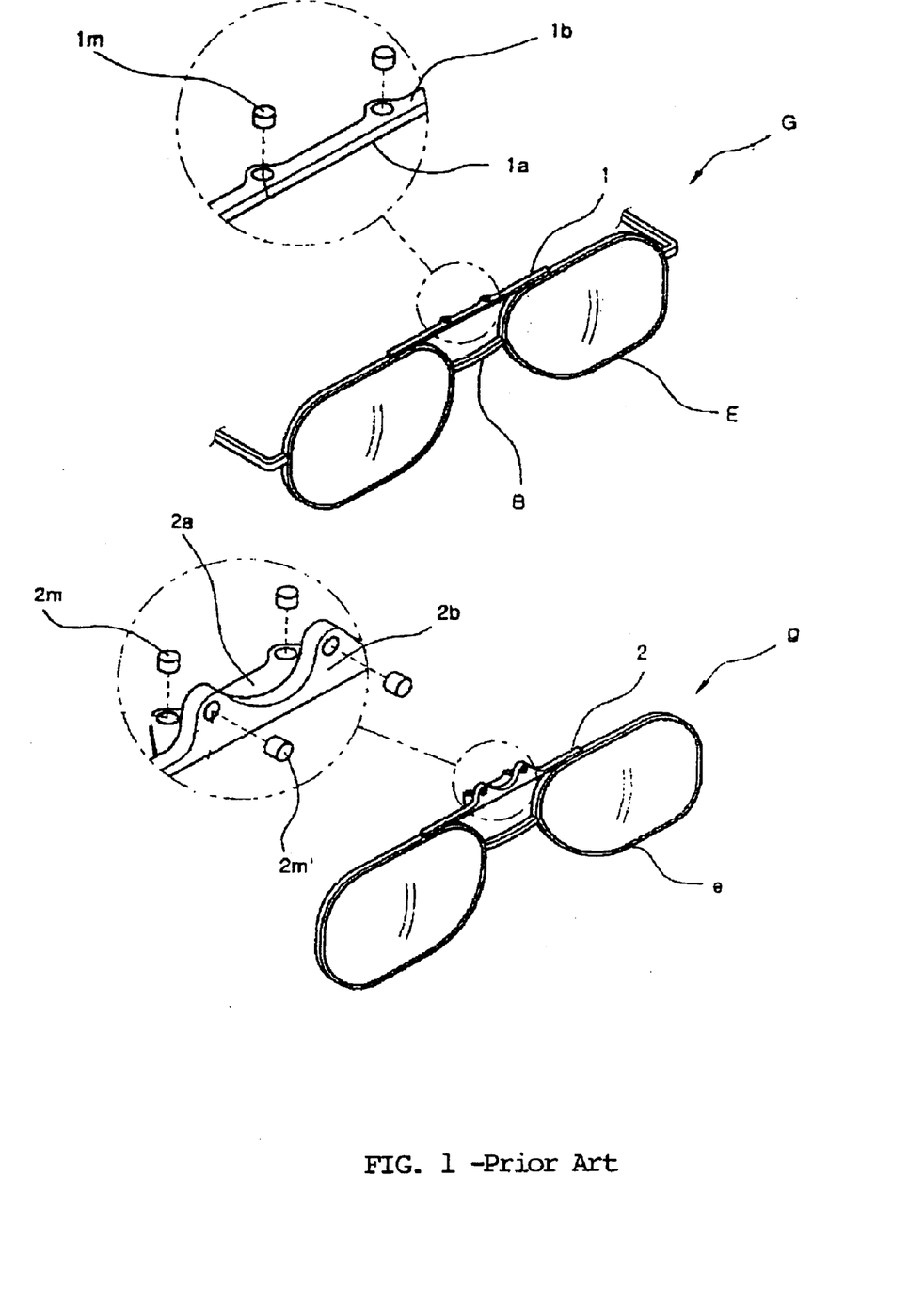
FIG. 1 is a detailed view illustrating the construction of a base and auxiliary eyeglass system in the prior art.
Figure 2:
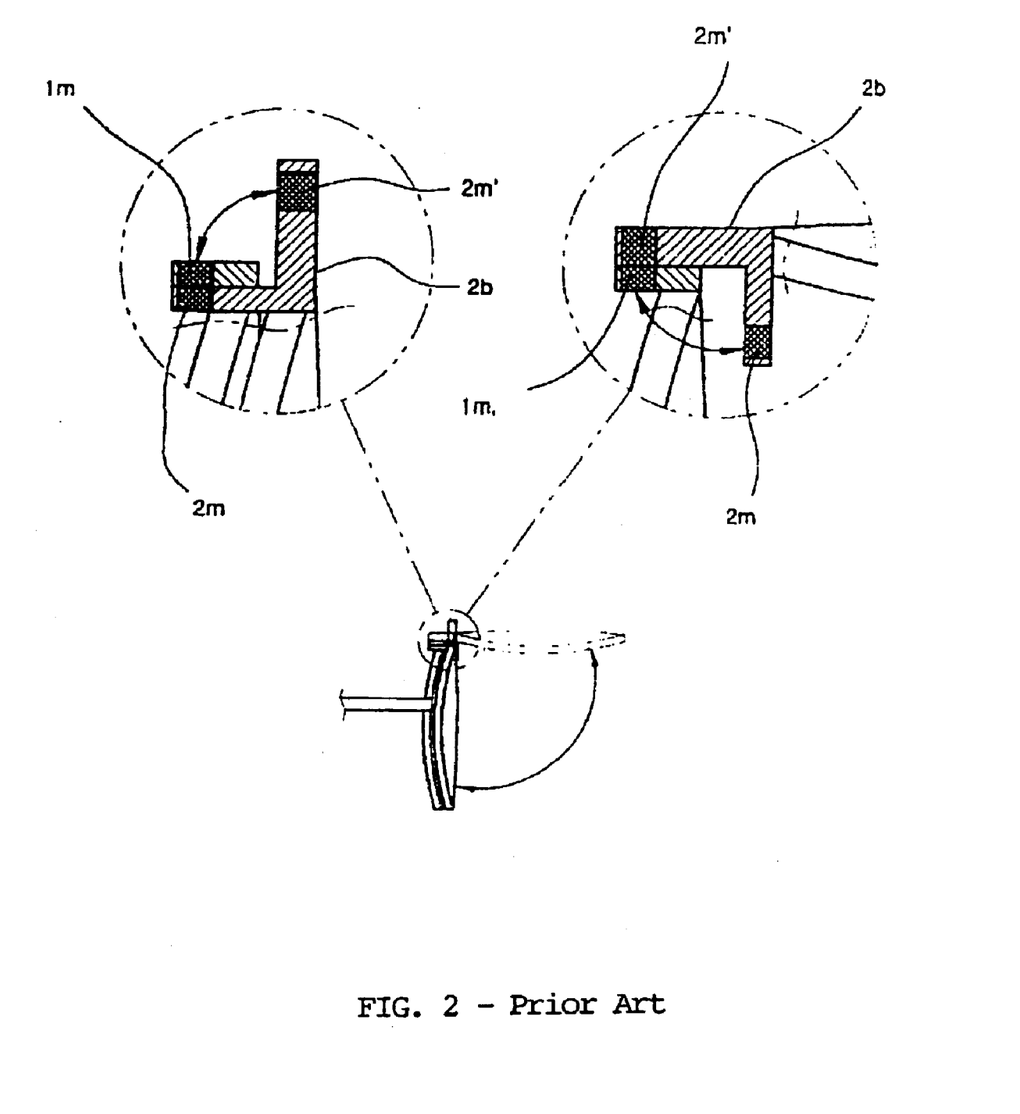
FIG. 2 is a cross sectional view illustrating a state in which auxiliary eyeglasses are folded and unfolded in the prior art of FIG. 1.

A base and auxiliary eyeglass system comprises base eyeglasses G having base eye rims E and a first bar 1 for horizontally connecting the uppermost portions of the base eye rims E, the first bar 1 having a base magnet 1*m* inserted into the central portion thereof. The auxiliary eyeglasses g have auxiliary eye rims e and a second bar 2 for horizontally connecting the uppermost portions of the auxiliary eye rims e, the second bar 2 having a horizontal portion 2*a* and a bent portion 2*b* extending upwardly from the horizontal portion 2*a* so as to be orthogonal to the horizontal portion 2*a*. The horizontal portion 2*a* and the bent portion 2*b* have magnets 2*m* and 2*m*' inserted thereinto, respectively, so that a user can easily attach/detach the auxiliary eyeglasses to/from the base eyeglasses and fold/unfold the auxiliary eyeglasses in front of the base eyeglasses. The utility model application has already been finally registered in Technical Evaluation in Korea.

In the prior art, the magnets are not directly inserted into the eye rims but rather the first and second bars act as guides for fixing the auxiliary eyeglasses to the base eyeglasses. Therefore, the second bar 2 and the first bar 1 are formed in the auxiliary eyeglasses and the base eyeglasses, respectively, as additional attachment/detachment means for attaching/detaching the auxiliary eyeglasses to the base eyeglasses and folding/unfolding the auxiliary eyeglasses. The system so constructed has problems in that its structure is complicated and there are restrictions in creative designs which are important in the eyeglass industry from an aesthetic point of view.

SUMMARY OF THE INVENTION

Accordingly, the present invention is directed to a base and auxiliary eyeglass system using magnets that substantially obviate one or more problems due to limitations and disadvantages of the related art.

An object of the present invention is to provide a base and auxiliary eyeglass system using magnets, which can easily unfold the auxiliary eyeglasses in front of the base eyeglasses without additional attachment/detachment means.

To achieve these objects and other advantages and in accordance with the purpose of the invention, as embodied and broadly described herein, there is provided a base and auxiliary eyeglass system using magnets, including base eyeglasses each having a base eye rim and a base magnet insertion part horizontally protruding from one side of the base eye rim so as to allow a magnetic material to be inserted thereinto, and auxiliary eyeglasses each having an auxiliary eye rim and a magnet hinge part protruding from one side of the auxiliary eye rim in such a manner as to be correspondingly coupled to the base magnet insertion part, the magnet hinge part having a magnetic material inserted thereinto, the magnetic material of the magnet hinge part reacting to the magnetic material inserted into the base magnet insertion part when the auxiliary eyeglasses are folded and unfolded.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figures 3A, 3B:
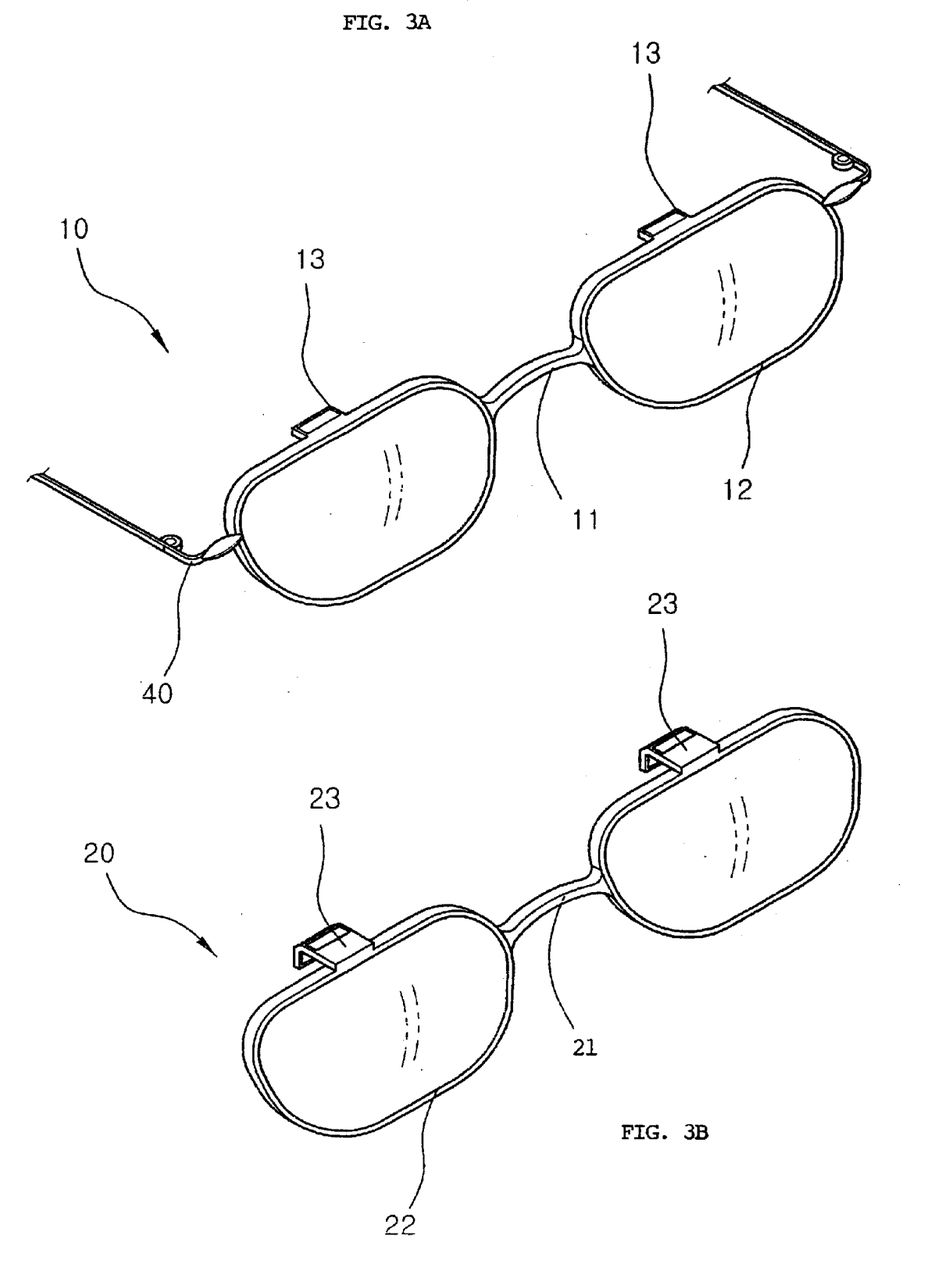
FIG. 3A is a perspective view illustrating the construction of the base eyeglasses of a base and auxiliary eyeglass system according to a first preferred embodiment of the present invention.
FIG. 3B is a perspective view illustrating the construction of the auxiliary eyeglasses of the base and auxiliary eyeglass system according to a first preferred embodiment of the present invention.
Figure 4:
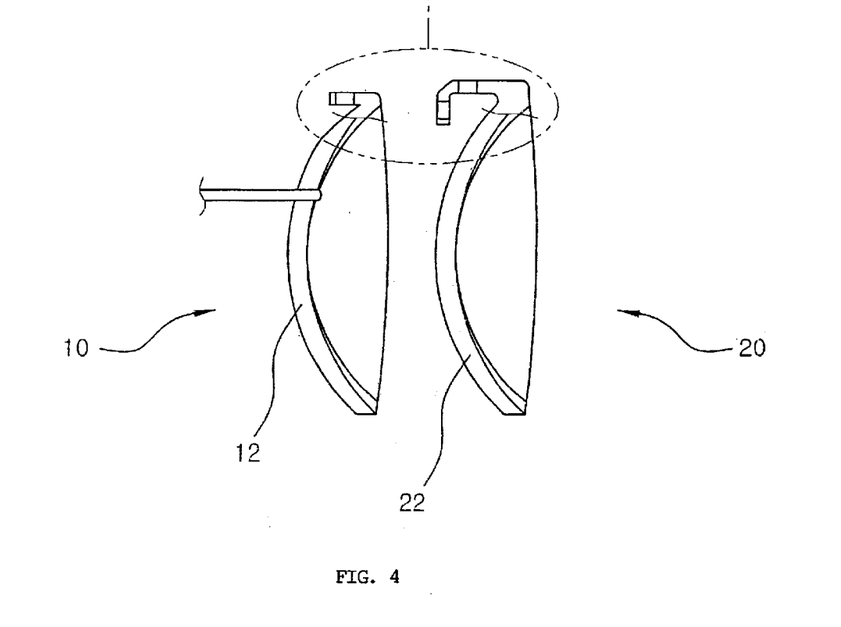
FIG. 4 is a side and cross-sectional view of the base and auxiliary eyeglass system shown in an unconnected state according to the first preferred embodiment of the present invention.
Figure 4A:
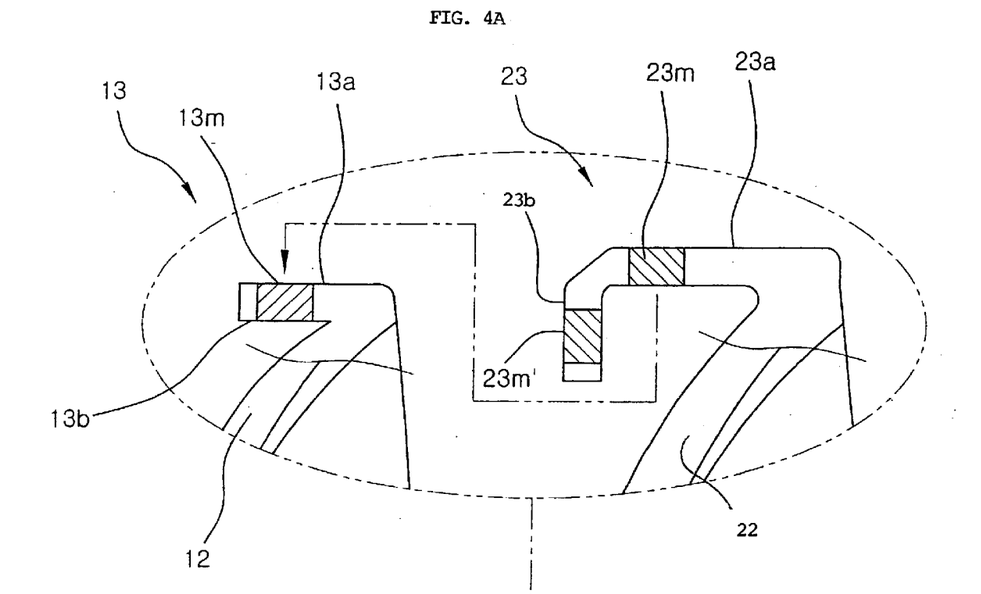
FIG. 4A is an enlarged side and cross-sectional view of the circled portion of FIG. 4.
Figures 10A, 10B:
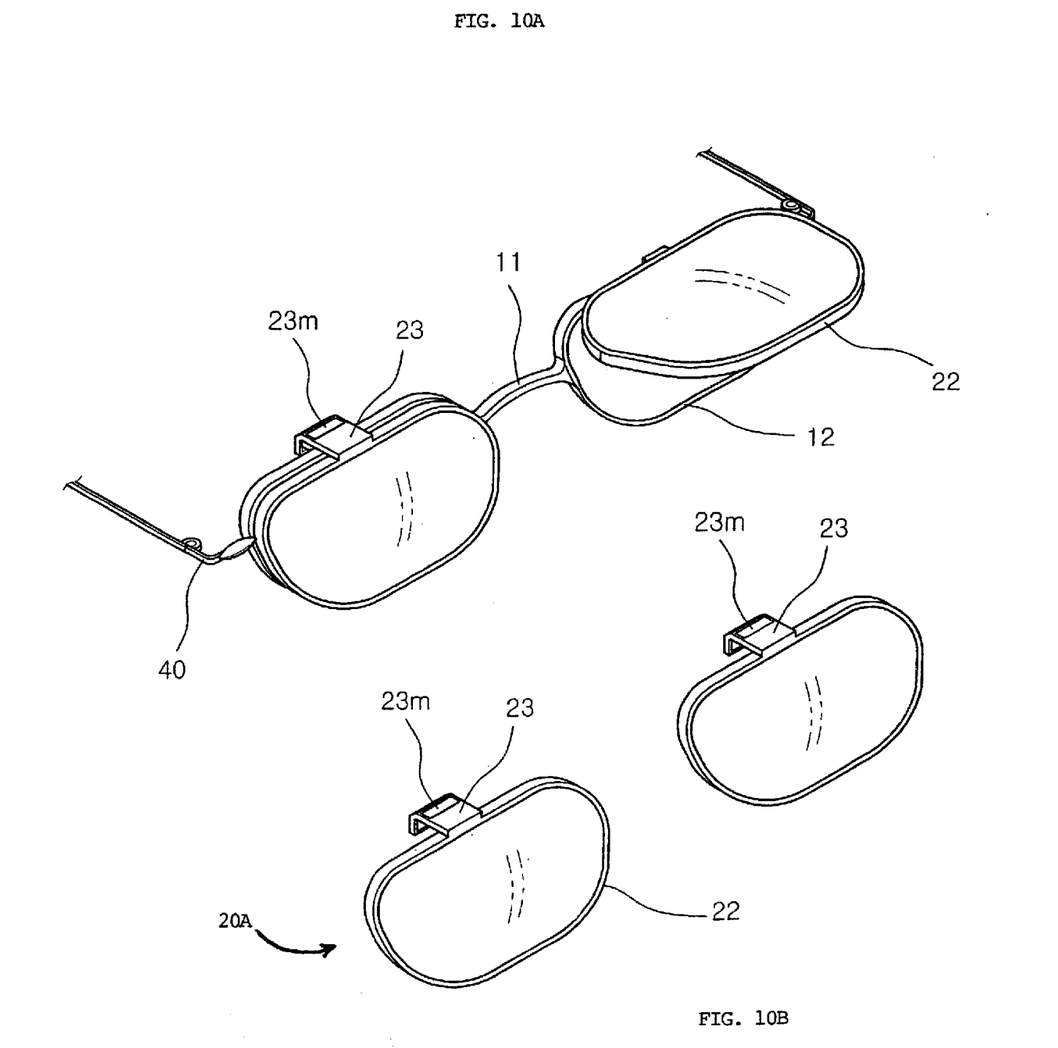
FIG. 10A is a perspective view illustrating the first connected position in which the base and the auxiliary eyeglass system is used according to a third preferred embodiment of the present invention.
FIG. 10B is a perspective view illustrating the auxiliary eyeglasses as detached from the eyeglass system according to the third preferred embodiment of FIG. 10A.
Figure 11:
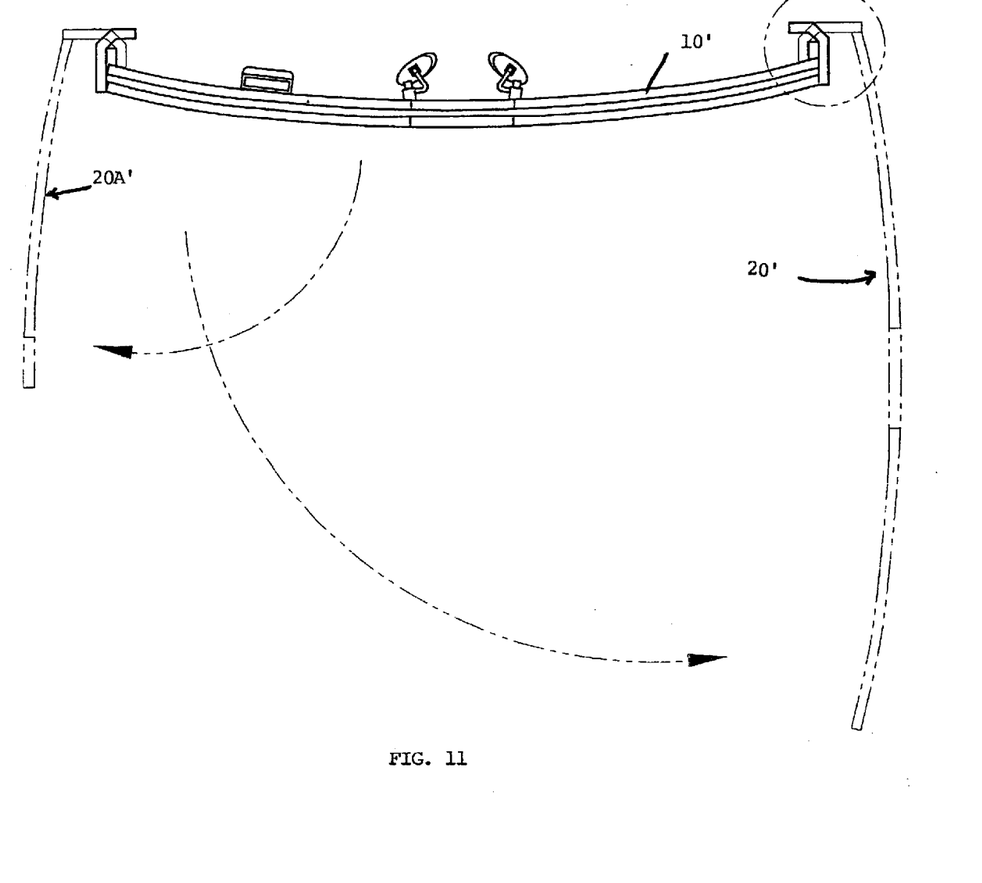
FIG. 11 is a top plan view illustrating the operation of a base and auxiliary eyeglass system according to a fourth preferred embodiment of the present invention.
Figure 11A:
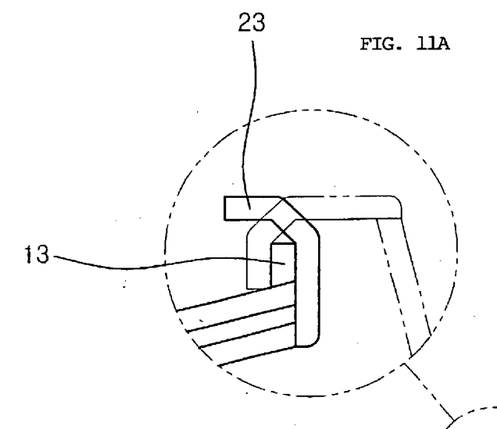
FIG. 11A is an enlarged top view of the circled portion of FIG. 11.
Figure 12:
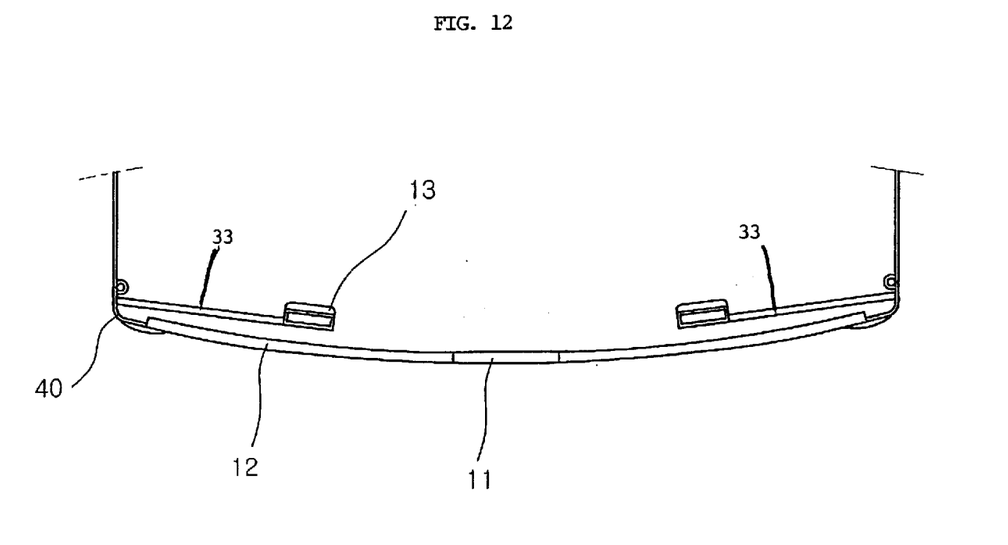
FIG. 12 is a top plan view of the base eyeglasses of a base and auxiliary eyeglass system according to a fifth preferred embodiment of the present invention.
Figure 13:
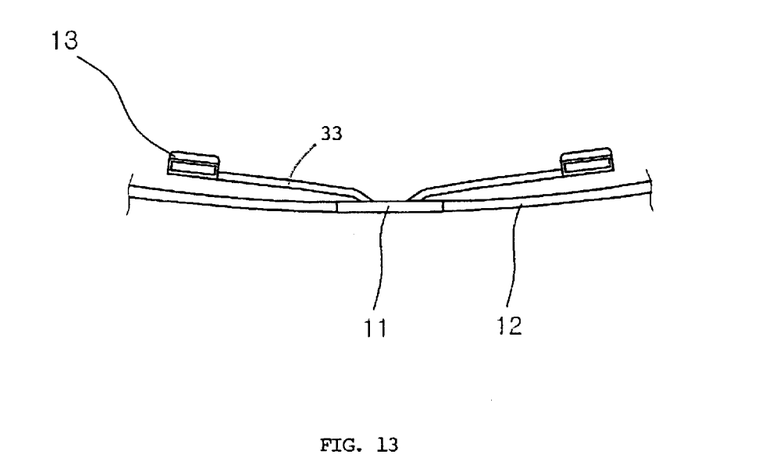
FIG. 13 is a top plan view of the base eyeglasses of a base and auxiliary eyeglass system according to a variation of the fifth preferred embodiment of the present invention.
Figure 14A:
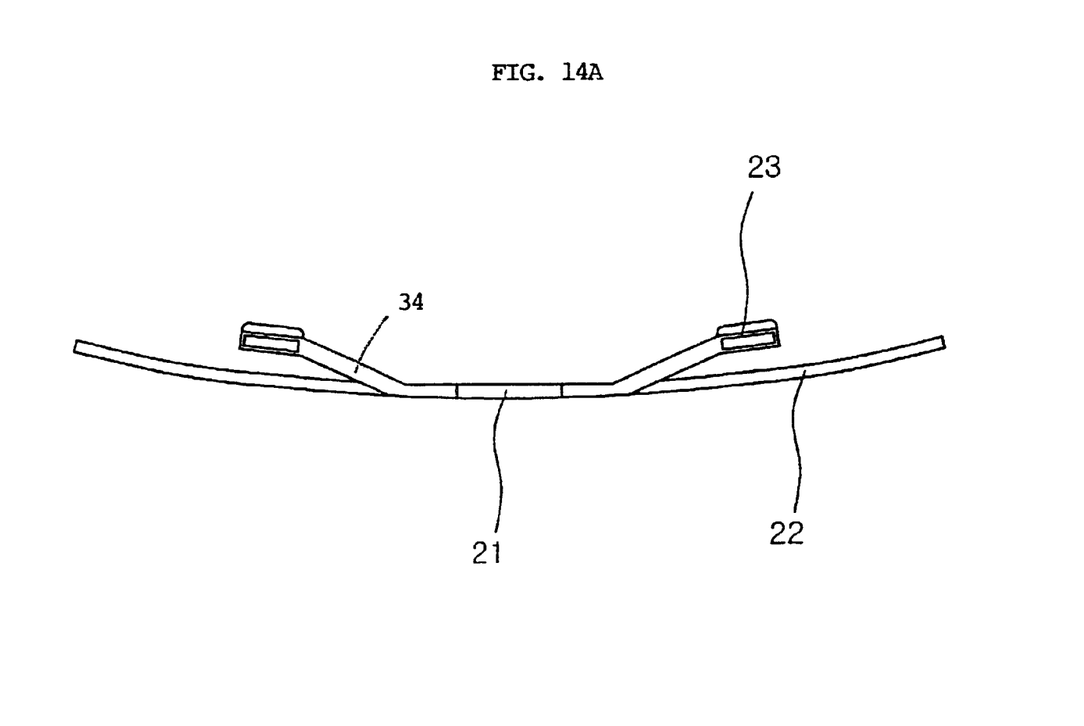
FIG. 14A is a top plan view of the auxiliary eyeglasses as designed to accommodate the eyeglass systems according to the fifth preferred embodiment of FIGS. 12 and 13.
Figure 14B:
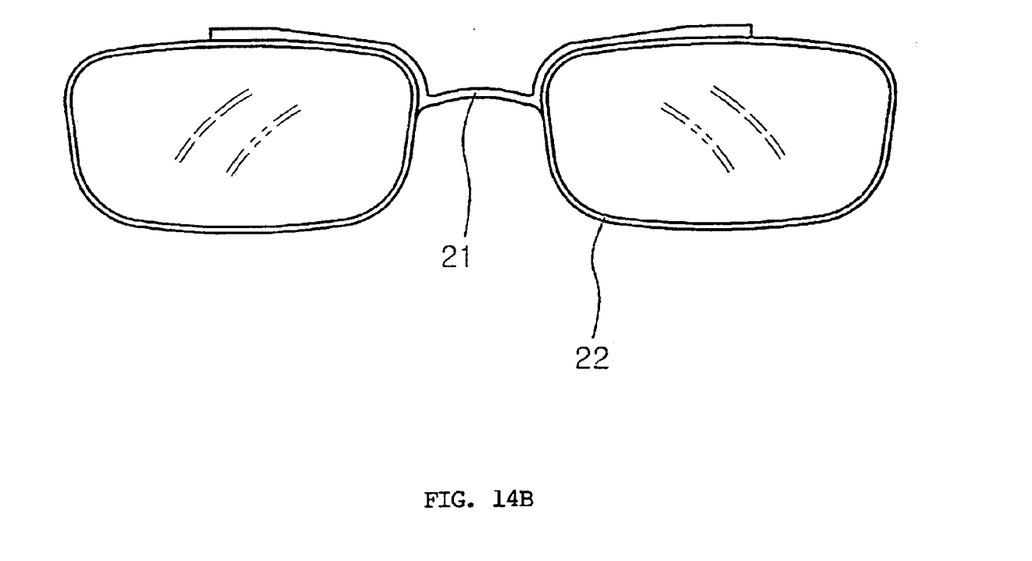
FIG. 14B is a front view of the auxiliary eyeglasses of FIG. 14A.

FIG. 1 is a detailed view illustrating the construction of a base and auxiliary eyeglass system in the prior art of the present applicant. FIG. 2 is a cross-sectional view illustrating a state in which auxiliary eyeglasses are unfolded in the prior art of FIG. 1. FIGS. 3A and 3B are perspective views illustrating the construction of a base and auxiliary eyeglass system according to a first preferred embodiment of the present invention. FIGS. 4 and 4A are a side and cross-sectional view of the base and auxiliary eyeglass system according to the first preferred embodiment of the present invention. FIGS. 5 and 5A and 6 and 6A are side and cross-sectional views of the base and auxiliary eyeglass system according to the first preferred embodiment of the present invention. FIGS. 7A and 7B are perspective views illustrating the states in which the base and auxiliary eyeglass system is used according to the first preferred embodiment of the present invention. FIGS. 8 and 8A and 9 and 9A are side and cross-sectional views of a base and auxiliary eyeglass system according to a second preferred embodiment of the present invention. FIGS. 10A and 10B are perspective views illustrating the states in which a base and auxiliary eyeglass system is used according to a third preferred embodiment of the present invention. FIGS. 11 and 11A are a top plan view illustrating the operation of a base and auxiliary eyeglass system according, to a fourth preferred embodiment of the present invention. FIGS. 12 and 13 are top plan views of the base eyeglasses of a base, and auxiliary eyeglass system according to a fifth preferred embodiment of the present invention. FIGS. 14A and 14B are a top plan view and a front view, respectively, of the auxiliary eyeglasses according to the fifth preferred embodiment of the present invention.

The base and auxiliary eyeglass system using magnets according to the present invention includes base eyeglasses 10 and auxiliary eyeglasses 20, which will be explained separately.

Referring to FIGS. 3A through 7B, each of the base eyeglasses 10 includes a base bridge 11, a base eye rim 12 having a magnetic material inserted into one side of the upper portion thereof, and a base magnet insertion part 13 horizontally protruding toward the inside of the base eyeglasses by such a predetermined distance so as not to interfere with glass lenses when the auxiliary eyeglasses are folded and unfolded. The base magnet insertion part 13 has a magnetic material inserted thereinto in such a manner that a magnetic force is generated in both the bottom surface 13b and the top surface 13a thereof.

A base magnet 13m inserted into the base magnet insertion part 13 has a thickness identical to or slightly smaller than that of the base insertion part 13, so that the base magnet 13m is not visible to others from the outside but performs its given function.

As previously said, according to the present invention, the base magnet insertion part 13 protrudes from the base eye rim 12 in each of the base eyeglasses so as to allow the magnetic material to be inserted thereinto without using any additional attachment/detachment means.

As shown in FIGS. 3A, 3B, 4 and 4A, each of the auxiliary eyeglasses 20 includes an auxiliary bridge 21, an auxiliary eye rim 22, and a magnet hinge part 23 protruding from one side of the auxiliary eye rim 22 by a predetermined distance in such a manner 80 as to correspond in position to the base magnet insertion part 13 in each of the base eyeglasses 10. The hinge part 23 is bent at the predetermined distance in such a manner as to wrap over the base magnet insertion part 13. The auxiliary magnet hinge part 23 includes an auxiliary eyeglass folding portion 23a horizontally protruding from the auxiliary eye rim 22 in such a manner as to be correspondingly coupled to the base magnet insertion part 13, and an auxiliary eyeglass unfolding portion 23b bent from the end of the auxiliary eyeglass folding portion 23a in such a manner as to wrap over the base magnet insertion part 13, the auxiliary eyeglass folding portion 23a having an auxiliary eyeglass folding magnet 23m inserted thereinto and the auxiliary eyeglass unfolding portion 23b having an auxiliary eyeglass unfolding magnet 23m' inserted thereinto.

Particularly, when seen from each side of the auxiliary eyeglasses 20, the section of the magnet hinge part 23 is generally an "L" shape protruding toward the inside of the base eyeglasses. The base magnet insertion part 13 protruding toward the inside of the base eyeglasses is positioned inside the inner space formed by the auxiliary eyeglass folding portion 23a and the auxiliary eyeglass unfolding portion 23b in such a manner as to correspond to the auxiliary eyeglass folding portion 23a.

The auxiliary eyeglass folding magnet 23m and the auxiliary eyeglass unfolding magnet 23m' inserted into the magnet hinge part 23 each have a thickness identical to or slightly smaller than that of the magnet hinge part 23, similarly to the case of the base magnet insertion part in each of the base eyeglasses 10, so that the magnets 23m and 23m' are not visible to others from the outside.

The magnetic material can be any material having a magnetic force capable of maintaining the state in which each of the auxiliary eyeglasses is folded and unfolded to be attached/detached to/from each of the base eyeglasses. That is to say, the magnetic material has a magnetic force strong enough to sufficiently control the weight of each of the auxiliary eyeglasses 20 so that the position of each of the auxiliary eyeglasses attached/detached to/from each of the base eyeglasses 10 is not changed unless an external force greater than a predetermined threshold is intentionally applied thereto. The magnetic material can be inserted into both the base magnet insertion part 13 and the magnet hinge part 23, or the magnetic material can be inserted into either of the base magnet insertion part 13 or the magnet hinge part 23, with metallic material which reacts to the magnetic material then being inserted into the other of the two parts.

In the base and auxiliary eyeglass system using the magnets constructed as above, states in which the auxiliary eyeglasses are folded and unfolded in front of the base eyeglasses will be explained in detail hereinbelow.

Referring to FIGS. 4 and 4A, the state in which each of the auxiliary eyeglasses 20, is folded in front of each of the base eyeglasses 10 will be explained. As previously mentioned, the magnet hinge part 23 includes the auxiliary eyeglass folding portion 23a protruding from the one side of the auxiliary eye rim 22 of each of the auxiliary eyeglasses 20 toward the inside of the base eyeglasses, and the auxiliary eyeglass unfolding portion 23b bent from the end of the auxiliary eyeglass folding portion 23a, such that the magnet hinge part 23 is correspondingly coupled to the base magnet insertion part 13, which protrudes from the one side of the upper portion of the base eye rim 12 in each of the base eyeglasses 10 and has the base magnet 13m inserted thereinto. When the auxiliary eyeglass folding magnet 23m inserted into the auxiliary eyeglass folding portion 23a magnetically reacts to the top surface 13a of the base magnet insertion part 13, each of the auxiliary eyeglasses 20 is supported on and secured to the base eye rim 12 in each of the base eyeglasses 10, thereby maintaining the state in which each of the auxiliary eyeglasses is folded.

Figure 5:
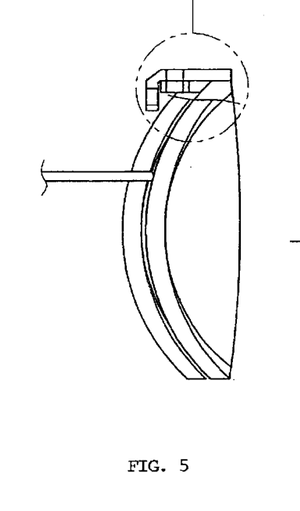
FIG. 5 is a side and cross-sectional view of the base and auxiliary eyeglass system shown in a first connected state according to the first preferred embodiment of the present invention.
Figure 5A:
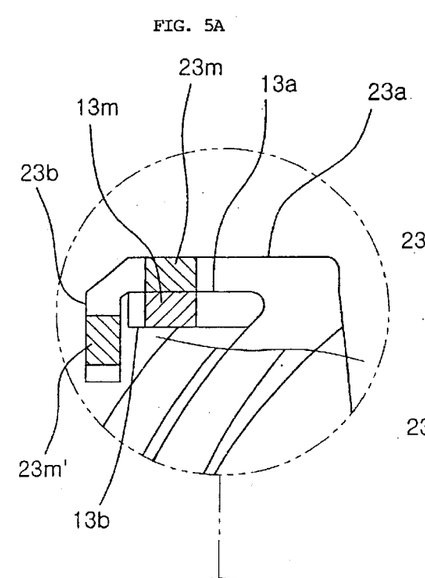
FIG. 5A is an enlarged side and cross-sectional view of the circled portion of FIG. 5.
Figure 6:
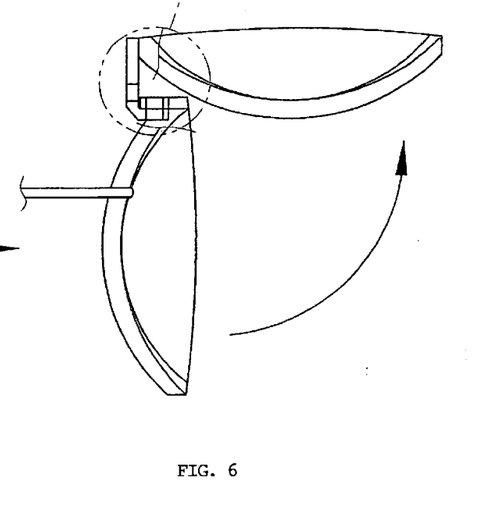
FIG. 6 is a side and cross-sectional view of the base and auxiliary eyeglass system shown in a second connected state according to the first preferred embodiment of the present invention.
Figure 6A:
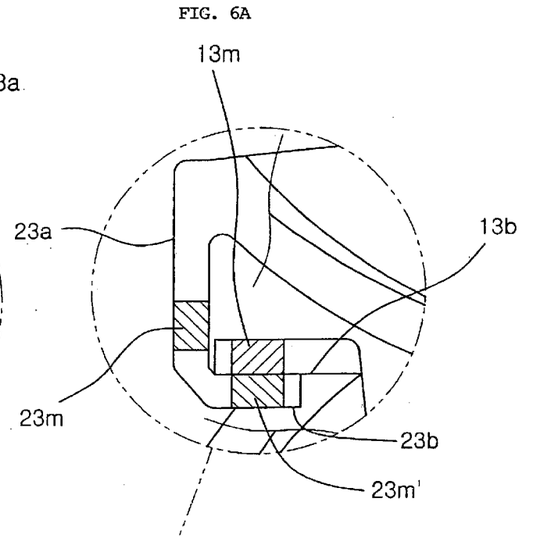
FIG. 6A is an enlarged side and cross-sectional view of the circled portion of FIG. 6.
Figure 7A:
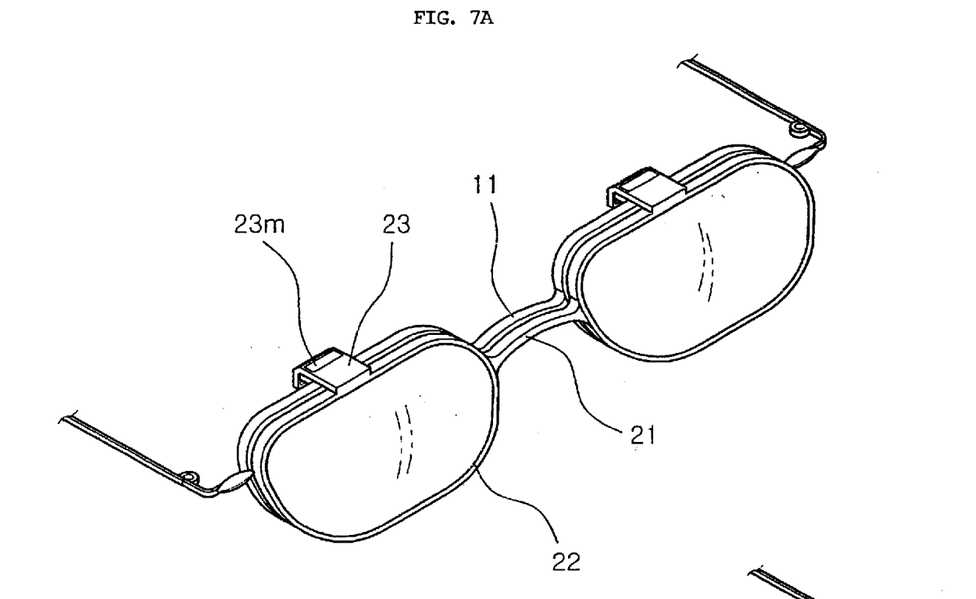
FIG. 7A is a perspective view illustrating the first connected position in which the base and the auxiliary eyeglass system is used according to the first preferred embodiment of the present invention.
Figure 7B:
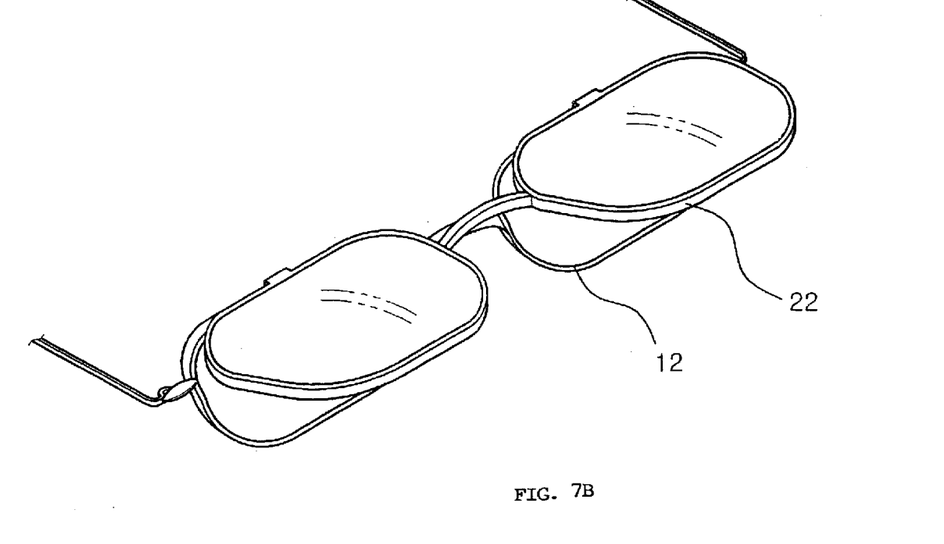
FIG. 7B is a perspective view illustrating the second connected position in which the base and the auxiliary eyeglass system is used according to the first preferred embodiment of the present invention.
Figure 8:
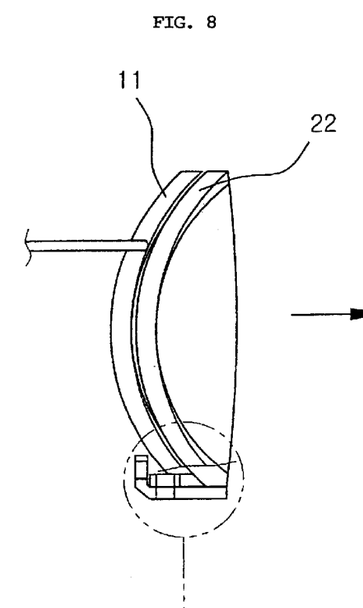
FIG. 8 is a side and cross-sectional view of a base and auxiliary eyeglass system shown in a first connected position according to a second preferred embodiment of the present invention.
Figure 8A:
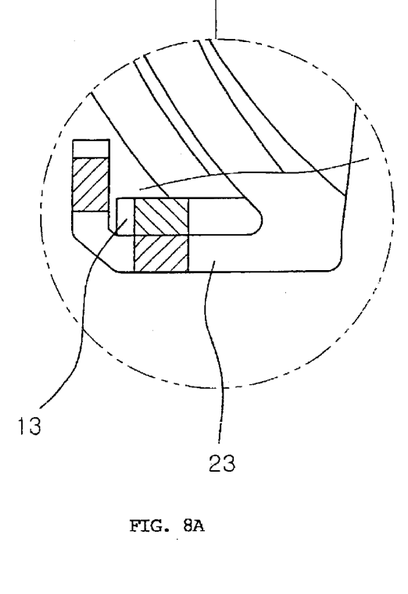
FIG. 8A is an enlarged side and cross-sectional view of the circled portion of FIG. 8.
Figure 9:
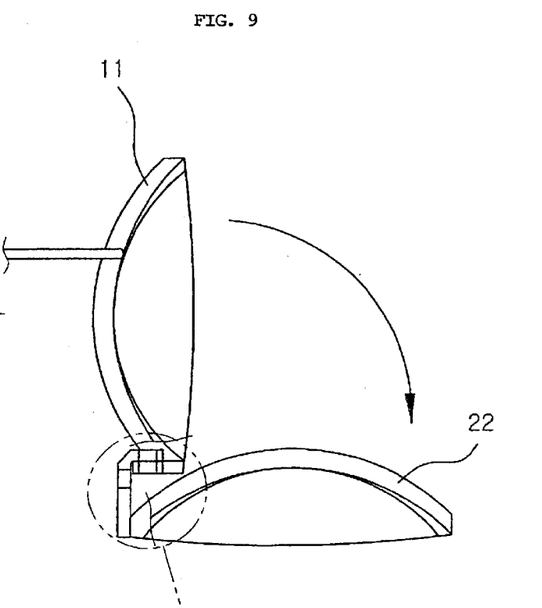
FIG. 9 is a side and cross-sectional view of a base and auxiliary eyeglass system shown in a second connected position according to the second preferred embodiment of the present invention.
Figure 9A:
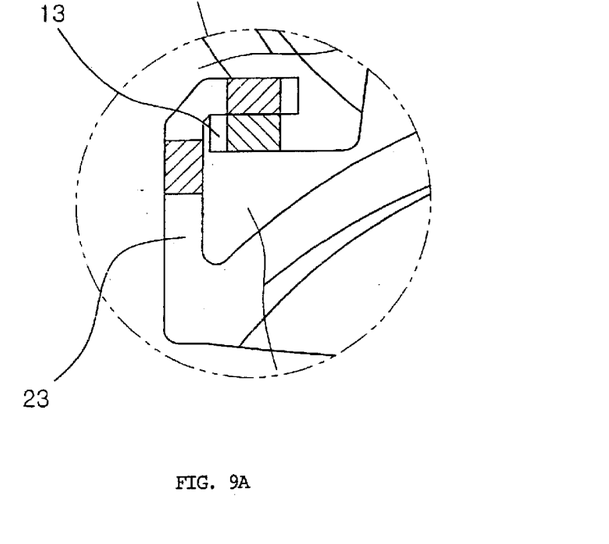
FIG. 9A is an enlarged side and cross-sectional view of the circled portion of FIG. 9.

When each of the auxiliary eyeglasses 20 folded in front of each of the base eyeglasses, as shown in FIGS. 5, 5A, and 7A, is lifted up by an external, force, as shown in FIGS. 6, 6A, and 7B, the state in which the auxiliary eyeglass folding portion 23a of the magnet hinge part 23 of the auxiliary eye rim 22 is fixed to the top surface 13a of the base magnet insertion part 13 into which the base magnet 13m is inserted is released by the external force. At the same time, the auxiliary eyeglass unfolding portion 23b of the magnet hinge part bent in such a manner as to wrap over the base magnet insertion part 13 approaches the bottom surface 13b of the base magnet insertion part 13. Finally, the base magnet 13m of the bottom surface 13b of the base magnet insertion part 13 of the base eye rim 12 magnetically reacts to the auxiliary eyeglass unfolding magnet 23m' inserted into the auxiliary eyeglass unfolding portion 23b of the magnet hinge part 23 of the auxiliary eye rim 22, thereby maintaining the state in which each of the auxiliary eyeglasses 20 is unfolded upwardly, away from and generally perpendicular to each of the base eyeglasses 10.

Conversely, when each of the unfolded auxiliary eyeglasses 20 is lowered again by an external force in front of each of the base eyeglasses 10, the state in which each of the auxiliary eyeglasses 20 is unfolded upwardly, away from each of the base eyeglasses 10 is released by the external force. At the same time, the auxiliary eyeglass folding portion 23a of the magnet hinge part 23 in each of the auxiliary eyeglasses 20 is bent and approaches the top surface 13a of the base magnet insertion part 13 in each of the base eyeglasses 10. Finally, the base magnet 13m inserted into the top surface 13a of the base magnet insertion part 13 is fixed to the auxiliary eyeglass folding magnet 23m inserted into the auxiliary eyeglass folding portion 23a of the magnet hinge part 23 in each of the auxiliary eyeglasses 20, thereby maintaining the state in which each of the auxiliary eyeglasses 20 is folded in front of, and generally parallel with, each of the base eyeglasses 10.

The present invention is not restricted to the auxiliary eyeglasses constructed as above but various types of auxiliary eyeglasses are included falling within the sprit of the present invention. As illustrated in FIGS. 8, 8A, 9 and 9A, the magnet hinge part 23 may be formed at the lower side of each of the auxiliary eyeglasses 20, with the corresponding base magnet insertion part 13 then being formed at the lower side of each of the base eyeglasses 10, such that the states in which each of the auxiliary eyeglasses is folded and unfolded occur in a different manner from the case of FIGS. 3A to 7B.

As shown in FIGS. 10A and 10B, the auxiliary bridge for connecting the auxiliary eye rims 22 of the auxiliary eyeglasses 20 may be removed such that the lenses of the auxiliary eyeglasses 20A are separated from each other. In this embodiment, the two auxiliary eyeglasses 20A are individually folded and unfolded.

As depicted in FIGS. 11 and 11A, the base magnet insertion part 13 corresponding to the magnet hinge part 23 of the auxiliary eye rim may be formed at one side of the base eyeglasses 10' in such a manner that each of the auxiliary eyeglasses does not interfere with the temple of each of the base eyeglasses when the auxiliary eyeglasses are folded or unfolded. As a result, the auxiliary eyeglasses can be unfolded in various configurations. For example, should the auxiliary eyeglasses be of the embodiment having two lenses connected by a bridge, represented by the dotted line of auxiliary eyeglasses 20', by appropriately positioning the hinge part 23 relative to the base magnet insertion part 13, the auxiliary eyeglasses 20' can be folded forwardly relative to the wearer's face as shown. Similarly, auxiliary eyeglasses of the embodiment having two lenses that are not connected to each other, as illustrated in FIG. 10B and represented by the dotted line of auxiliary eyeglasses 20A', may be individually connected on the sides of the base eyeglasses and, when viewing therethrough is not desired, folded forwardly, one on either side of the base eyeglasses 10'.

Furthermore, as illustrated in FIGS. 12 and 13, the base magnet insertion part 13 may alternatively be formed to extend in a long rod 33 from a lug 40 or from the base bridge 11, respectively, to a wanted position in the vicinity of the base eye rim. As shown in FIGS. 14A and 14B, the magnet hinge part 23 may extend in the form of a long rod 34 from the auxiliary bridge 21 of the auxiliary eyeglasses 20 to a wanted position in the vicinity of the auxiliary eye rim, and not be formed on the auxiliary eye rim 22.

As described above, with the base and auxiliary eyeglass system using the magnets constructed as above, it is possible to easily fold and unfold the auxiliary eyeglasses by changing the structure of the conventional base and auxiliary eyeglass system without additional attachment/detachment means, solving the problem of restricted designs which occurs in the prior art due to the necessity for added components. The inventive eyeglass system also achieves lighter weight and smaller size without compromising function, giving users greater satisfaction and convenience in use.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A base and auxiliary eyeglass system using magnets, comprising:

base eyeglasses each having a base eye rim and a base magnet insertion part formed on the base eye rim; and auxiliary eyeglasses each having an auxiliary eye rim and a magnet hinge part formed on the auxiliary eye rim in such a manner as to be correspondingly coupled to the base magnet insertion part in either a folded position or an unfolded position.

2. The base and auxiliary eyeglass system according to claim 1, wherein each of the base eyeglasses has the base magnet insertion part formed on one side of an uppermost portion of the base eye rim, and each of the auxiliary eyeglasses has the magnet hinge part formed on one side of an uppermost portion of the auxiliary eye rim in such a manner as to be correspondingly coupled to the base magnet insertion part.

3. The base and auxiliary eyeglass system according to claim 1, wherein two auxiliary eye rims of the auxiliary eyeglasses are individually separable from the base eye rims of the base eyeglasses and have magnet hinge parts formed thereon.

4. The base and auxiliary eyeglass system according to claim 1, wherein the base magnet insertion part horizontally protrudes from one side of the base eye rim toward an inside of the base eyeglasses so as to allow a magnetic material to be inserted thereinto.

5. The base and auxiliary eyeglass system according to claim 1, wherein the base magnet insertion part is formed on only one of the base eye rims.

6. The base and auxiliary eyeglass system according to claim 1, wherein the base magnet insertion part is fitted on a long rod that extends from a lug of each of the base eyeglasses toward a desired position adjacent the base eye rim.

7. The base and auxiliary eyeglass system according to claim 1, wherein the base magnet insertion part is fitted on a long rod that extends from a base bridge toward a desired position adjacent the base eye rim.

8. The base and auxiliary eyeglass system according to claim 1, wherein the magnet hinge part has an auxiliary eyeglass folding portion horizontally protruding toward an inside of the auxiliary eyeglasses, and an auxiliary eyeglass unfolding portion downwardly bent from the auxiliary eyeglass folding portion so as to be generally perpendicular thereto.

9. The base and auxiliary eyeglass system according to claim 1, wherein a magnet in, said folding portion is magnetically secured to said base magnet insertion part when said auxiliary eyeglasses are folded to be generally parallel with said base eye rims, and a magnet in said unfolding portion is magnetically secured to said base magnet insertion part when said auxiliary eyeglasses are unfolded to be generally perpendicular to said base eye rims.

10. The base and auxiliary eyeglass system according to claim 1, wherein the magnet hinge part is fitted on a long rod that extends from an auxiliary bridge to a desired position adjacent the auxiliary eye rim, said auxiliary bridge joining the eye rims of the auxiliary eyeglasses.

11. The base and auxiliary eyeglass system according to claim 1, wherein the magnet hinge part is constructed in a semi-oval in such a manner as to surround the base magnet insertion part in each of the base eyeglasses.

12. The base and auxiliary eyeglass system according to claim 1, wherein either of the base magnet insertion part or the magnet hinge part is formed of magnetic material and the other part is formed of material magnetically reactable and securable to the magnetic material.

13. The base and auxiliary eyeglass system according to claim 1, wherein the base magnet insertion part formed on one side of the base eye rim and having a base magnet inserted thereinto is formed on a common axis with the base eye rim.

14. The base and auxiliary eyeglass system according to claim 1, wherein the magnet hinge part horizontally protrudes such that a magnetic force is generated only when each of the auxiliary eyeglasses is unfolded upwardly in front of the base eyeglasses.

15. The base and auxiliary eyeglass system according to claim 1, wherein said auxiliary eyeglasses in said folded position are generally parallel with said base eyeglasses and in said unfolded position are generally perpendicular to said base eyeglasses.

16. The base and auxiliary eyeglass system according to claim 15, wherein said auxiliary eyeglasses in said unfolded position extend upwardly from said base eyeglasses.

17. The base and auxiliary eyeglass system according to claim 15, wherein said, auxiliary eyeglasses in said unfolded position extend forwardly from said base eyeglasses.

18. The base and auxiliary eyeglass system according to claim 17, wherein two auxiliary eye rims of the auxiliary eyeglasses are individually separable from the base eye rims of the base eyeglasses and have magnet hinge parts formed thereon, each auxiliary eye rim extending forwardly from a respective side of said base eyeglasses when in said unfolded position.

* * * * *